United States Patent
Lindroos

(10) Patent No.: US 7,822,547 B2
(45) Date of Patent: Oct. 26, 2010

(54) APPARATUS AND METHOD FOR ENHANCING THE UTILIZATION OF DISTANCE MEASURING DEVICES

(75) Inventor: Sanna Lindroos, Valkeakoski (FI)

(73) Assignee: Nokia Corporation, Espoo (FI)

( * ) Notice: Subject to any disclaimer, the term of this patent is extended or adjusted under 35 U.S.C. 154(b) by 983 days.

(21) Appl. No.: 11/595,431

(22) Filed: Nov. 9, 2006

(65) Prior Publication Data

US 2008/0114538 A1     May 15, 2008

(51) Int. Cl.
  *G01C 21/00*  (2006.01)
  *G01C 21/34*  (2006.01)
(52) U.S. Cl. .................................. 701/211; 340/995.19
(58) Field of Classification Search .................. None
  See application file for complete search history.

(56) References Cited

U.S. PATENT DOCUMENTS

| | | | | |
|---|---|---|---|---|
| 4,494,116 A | * | 1/1985 | Tagami et al. | 340/995.28 |
| 6,132,391 A | * | 10/2000 | Onari et al. | 600/595 |
| 6,826,473 B1 | * | 11/2004 | Burch et al. | 701/207 |
| 7,245,254 B1 | * | 7/2007 | Vogt | 342/357.06 |
| 7,440,847 B2 | * | 10/2008 | Unuma et al. | 701/201 |
| 7,627,423 B2 | * | 12/2009 | Brooks | 701/202 |
| 2003/0236709 A1 | * | 12/2003 | Hendra et al. | 705/26 |
| 2004/0023686 A1 | * | 2/2004 | King et al. | 455/550.1 |
| 2005/0137792 A1 | * | 6/2005 | Tsuge | 701/209 |
| 2005/0250458 A1 | * | 11/2005 | Graham et al. | 455/121 |
| 2006/0136173 A1 | * | 6/2006 | Case et al. | 702/182 |
| 2008/0103794 A1 | * | 5/2008 | Pettiross et al. | 705/1 |

FOREIGN PATENT DOCUMENTS

| | | | |
|---|---|---|---|
| JP | 2000-209142 | * | 7/2000 |
| JP | 2001-296139 | * | 10/2001 |
| JP | 2003-210636 | * | 7/2003 |

* cited by examiner

*Primary Examiner*—Michael J. Zanelli
(74) *Attorney, Agent, or Firm*—Ditthavong Mori & Steiner, P.C.

(57) ABSTRACT

Systems, apparatuses and methods for enhancing the utilization of distance measuring devices using electronic communication devices. A route(s) presentable via a map or map segment may be presented via a mobile device. A distance walked, jogged, or otherwise traveled by a user of the mobile device can be determined using a distance measuring device, such as a step counter. The resulting distance traveled is associated with the presented route to indicate an approximate location of the user on the presented route. The route may be any imaginary or virtual route, whereby the user's actual distance traveled on his/her actual route is depicted on the map/map segment as traveling on the virtual route. Communication tools allow data to be obtained, messages to be communicated, and other services to be performed at certain times and/or in connection with reached locations along the route.

47 Claims, 6 Drawing Sheets

APPARATUS AND METHOD FOR ENHANCING THE UTILIZATION OF DISTANCE MEASURING DEVICES

FIELD OF THE INVENTION

This invention relates in general to distance measuring devices, and to systems, methods and apparatuses for enhancing the utilization of distance measuring devices using electronic communication devices.

BACKGROUND OF THE INVENTION

Good physical fitness is crucial to maintaining good health and fighting disease. Medical evidence has suggested that exercise is instrumental in the pursuit of well-being and longevity. Motivation plays a significant role in one's interest in continuous and productive exercise. Although exercise videos, programming, and literature abound, many people quickly lose interest in such short-term motivational tools. Such conventional exercise enhancements often fail to provide the requisite appeal or feedback needed to keep an individual motivated in a given exercise regimen. Thus, the proper motivators play a significant role in fitness perseverance.

Various fitness feedback tools can provide some level of motivation. For example, heart rate monitors are often used by individuals when engaging in an exercise activity. This feedback, in the form of a physiological measurements of the individual's heartbeat, may help the individual train at the proper level and/or reinforce the individual's notion of training hard. Other monitors such as a fat monitor can motivate individuals by enabling the immediate and spontaneous assessment of the individual's progress towards a goal. These types of devices thereby provide some level of motivation to engage, or continue to engage, in the activity.

Another fitness tool that has been used is a pedometer. Generally, a pedometer tracks the number of steps taken by an individual, and in some cases can calculate a distance walked if the average step length is also known. While a pedometer is a useful tool, it provides only raw count or distance data and is unimaginative. There is no correlation of the data to other information, or use of the data for anything other than the steps or corresponding distance.

Accordingly, there is a need for manners of heightening motivation in walking, jogging, etc. There is also a need to enhance the appeal of information provided by devices such as pedometers or other count/distance measuring devices. The present invention fulfills these and other needs, and offers other advantages.

SUMMARY OF THE INVENTION

To overcome limitations described above, and to overcome other limitations that will become apparent upon reading and understanding the present specification, the present invention discloses systems, apparatuses and methods for enhancing the utilization of distance measuring devices using electronic communication devices.

In accordance with one embodiment of the invention, a method is provided which involves presenting at least one route via a mobile device. A distance traveled by the mobile device is determined, and the distance traveled is associated with the presented route to indicate an approximate location of the device on the presented route.

In embodiments of such a method, the presented route may correspond to a virtual route different from the actual route physically traveled by the user. For example, the user may be actually jogging in the U.S., while the virtual route is a selected route in Asia. In another embodiment, the device allows the user to modify the route from a current virtual route to a new virtual route. If desired, the distance already traveled along the current virtual route can be applied to the new virtual route. In another embodiment, a communication application can be invoked to enable user communication appearing to a recipient to originate from a location along the virtual route.

In embodiments of such a method, the user can select at least a portion of the virtual route in which the travel will be simulated. In another embodiment, the user can modify the particular route to be traveled to the destination. In still other embodiments, different types of distance measuring techniques may be employed, such as by determining a distance traveled by approximating the distance traveled using a step counter. Another representative technique involves determining a distance traveled by approximating the distance traveled by comparing a current location with a starting location, such as, for example, comparing global positioning system (GPS) coordinates of the current physical location and starting physical location.

In still other embodiments of such a method, associating the distance traveled with the presented route may include superimposing a progressive visual course on the presented route substantially corresponding to the distance traveled by the user along the presented route. In another embodiment, presenting a route(s) via a mobile device involves presenting a map segment including an available route(s), and where associating the distance traveled with the presented route involves depicting a traveled distance by the user on a selected one of the available routes. In a more particular embodiment, the user is allowed to select one of the available routes, thereby identifying the selected one of the available routes.

Other embodiments of such a method include presenting information when the user reaches a marked point along the route. In one embodiment, this involves facilitating user designation of one or more marked points. The presentation of information upon reaching a marked point may involve, for example, invoking a data connectivity application when the user reaches the marked point along the route, and presenting the information obtained via the data connectivity application. Other applications may also be implemented, such as a postcard application to initiate dispatching a postcard corresponding to a vicinity along the route.

One embodiment of the method involves executing computer executable software/firmware modules to carry out operations involved with the method. For example, one embodiment involves a computer-readable medium having instructions stored thereon which are executable by a computing system to present a route(s) via a device, determine a distance traveled by the device, and associating the distance traveled with the presented route(s) to indicate an approximate location of the device on the presented route.

In accordance with another embodiment of the invention, an apparatus is provided that includes a distance measuring device that outputs a distance indicator indicative of a distance traveled by a user. A processing module receives the distance indicator, and determines a user's approximate location relative to a route based on the distance indicator. A presentation module presents the route and at least the user's approximate location relative to the route.

According to one embodiment of such an apparatus, the presentation module presents the route as a virtual route different from the actual route physically traveled by the user. In another embodiment, the distance measuring device is a pedometer that provides the distance indicator as a distance traveled relative to a starting location. In another embodiment, the distance measuring device is a step counter that provides the distance indicator as a step count by the user relative to a starting location, where the processing module is configured to calculate the distance traveled by the user based on the step count and a step length of the user. In another embodiment of such an apparatus, the distance measuring device is a location identification module that provides the distance indicator as coordinates of the user's current physical location, where the processing module is configured to calculate the distance traveled by the user by determining the difference between the coordinates of the user's current physical location and coordinates of a reference location. One embodiment involves a global positioning system (GPS) module as the location identification module.

According to other embodiments of the apparatus, a communication module can be provided to enable user communication appearing to a recipient to originate from a location along the virtual route. In another embodiment, a data communication module is provided to enable at least the receipt of data at the apparatus in response to the user reaching a location on the route. One embodiment involves a user interface to allow the user to mark a location(s) on the route in which to receive the data. Other applications may be involved with the apparatus, such as a postcard module operable with the processing module to initiate dispatch of a postcard corresponding to a vicinity along the route.

In accordance with another embodiment of the invention, a method is provided that involves receiving route selection data and user travel distance data from a first device of a first user, and determining a distance traveled by the first user based on the received user travel distance data. A map segment is provided to the first device, where the map segment includes at least one route identified using the route selection data, and includes a route identifier showing the current location of the first user based on the distance traveled. In one embodiment, the method involves receiving updates of the user travel distance data, determines updated distances traveled by the first user, and provides an updated map segment to the first device, where the map segment identifies on the route the current location of the first user based on the updated distance traveled.

In other embodiments of such a method, providing a map segment involves providing map segment including the identified route(s) and a depiction of the distance traveled in view of a known scale of the map segment. In another embodiment, determining a distance traveled involves using the user travel distance data directly as the distance traveled. Still another embodiment involves receiving a step length value from the first device, where the user travel distance data includes a step count, and where determining a distance traveled involves calculating a mathematical product of the step length and the step count. In yet another embodiment, the user travel distance data includes coordinates of a location of the first user, and determining a distance traveled involves comparing the coordinates of the location of the first user with coordinates of a starting location.

According to another embodiment of such a method, receiving route selection data and user travel distance data involves receiving route selection data and user travel distance data from the first device and one or more second devices of respective second users; determining a distance traveled involves determining the distance traveled by each of the first and second users; and providing a map segment involves providing the map segments to the first and second devices, the map segments including the routes identified using the respective route selection data and respective current locations of the first and second users based on the respective distances traveled.

In other embodiments, the method may further include determining if any of the users among the first and second users are traveling on a common actual or virtual route, and transmitting at least one message between the users determined to be on a common actual or virtual route. In another embodiment, the method involves determining if any of the users among the first and second users reach a marked location on an actual or virtual route, and transmitting at least one message to the devices of one or more of the other users in response thereto. In another embodiment, the method involves facilitating communication between any of the first and second users. In still another embodiment, the method involves initiating group communication between any two or more of the first and second users when the two or more of the first and second users are within a predetermined location on the route from one another.

One embodiment of the method involves executing computer executable software/firmware modules to carry out operations involved with the method. For example, one embodiment involves a computer-readable medium having instructions stored thereon which are executable by a computing system to receive route selection data and travel distance data from a device, determine a distance traveled by the device based on the received travel distance data, provide a map segment to the device, where the map segment includes at least one route identified using the route selection data, and an identification on the at least one route a current location of the device based on the distance traveled.

In accordance with another embodiment of the invention, an apparatus is provided that includes a receiver to receive route selection data and user travel distance data from one or more communication devices. The receiver may be a separate receiver, or may be combined with other components as in the case of a transceiver. A processing module is configured to identify actual or virtual travel routes for each of the one or more communication devices in response to the received route selection data, and is further configured to calculate actual distances traveled by each of respective users of the one or more communication devices in response to the received user travel distance data. A transmitter selectively provides map segments to each of the one or more communication devices, each of the map segments including the identified actual or virtual routes for the respective user, and an identification of the respective user's location on the respective actual or virtual route using the calculated actual distances traveled.

In one embodiment, a system is provided that includes a mobile device(s) and at least one network entity. The mobile device includes a distance measuring device that outputs a distance indicator indicative of a distance traveled, and a transmitter to transmit the distance indicator and route selection data. The network entity includes a receiver to receive the route selection data and the distance indicator, and a processing module configured to identify a route(s) for the mobile device in response to the received route selection data. The processing module is further configured to calculate an actual distance traveled by the mobile device in response to the received distance indicator. The network entity includes a transmitter to transmit a map segment(s) to the mobile device, where the map segment(s) includes the identified route, and an identification of the location on the route using the calculated actual distances traveled.

The above summary of the invention is not intended to describe every embodiment or implementation of the present invention. Rather, attention is directed to the following figures and description which sets forth representative embodiments of the invention.

BRIEF DESCRIPTION OF THE DRAWINGS

The invention is described in connection with the embodiments illustrated in the following diagrams.

DETAILED DESCRIPTION OF EMBODIMENTS OF THE INVENTION

In the following description of the exemplary embodiment, reference is made to the accompanying drawings which form a part hereof, and in which is shown by way of illustration various manners in which the invention may be practiced. It is to be understood that other embodiments may be utilized, as structural and operational changes may be made without departing from the scope of the present invention.

Generally, the present invention provides a manner of enhancing the utilization of distance measuring devices using electronic communication devices. A route(s) presentable via a map or map segment may be presented via a mobile device. A distance walked, jogged, or otherwise traveled by a user of the mobile device can be determined using a distance measuring device. The resulting distance traveled is associated with the presented route to indicate an approximate location of the user on the presented route. In one embodiment, the route is an imaginary or virtual route, whereby the user's actual distance traveled on his/her actual route is depicted on the map/map segment as traveling on the virtual route. Communication tools allow data to be obtained, messages to be communicated, and other services to be performed at certain times and/or in connection with reached locations along the route.

Figure 1:
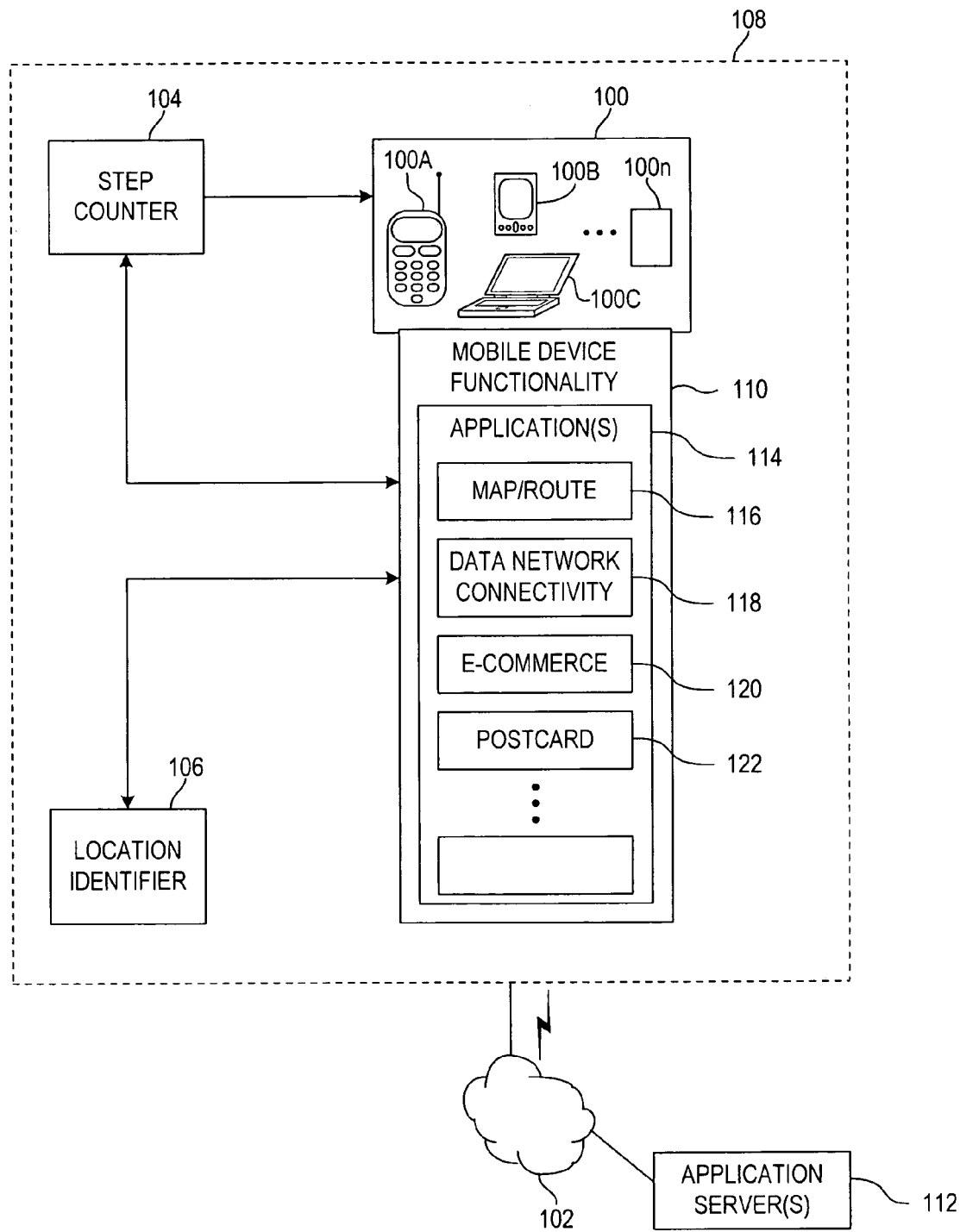
FIG. 1 is a block diagram illustrating one embodiment of a mobile communication device in accordance with the invention.

FIG. 1 is a block diagram illustrating one embodiment of the invention. A device capable of at least processing and presenting information is provided, such as the mobile device 100 shown in FIG. 1. The mobile device 100 may include, for example, a mobile phone 100A, a personal digital assistant (PDA) 100B, a portable computing device 100C, a portable game device, a portable GPS device, a portable camera/camcorder, a portable audio/video device, a portable AM/FM/Digital radio device, a portable television device, a wrist watch, a step counter, other such device 100n or any combination of the aforementioned. The mobile device 100 includes processing capabilities whereby it can communicate information via a network(s) 102, which may include mobile networks (such as mobile telecommunication, GSM/GPRS, WLAN, 3G, etc.), and/or short range communication networks (such as Bluetooth, Wibree™, infrared/IrDA, Ultra Wide Band or UWB, etc.), and/or landline networks (e.g., Internet, LAN, etc.). In one embodiment, the device 100 is of a size capable of being carried with a user of the device.

In accordance with one aspect of the invention, a distance measuring device is used to assist in the determination of the distance in which the device user has moved or traveled. In the illustrated embodiment, the distance measuring device may include a step counter 104, otherwise known as a pedometer. Generally, a step counter 104 is an electronic device that can be attached to a person, and uses a mechanism such as a pendulum to sense movement indicative of a person taking a step. These step recognitions can be counted at the step counter 104, or the output can be provided to a device such as the mobile device 100 where the raw output of a step counter 104 can be counted.

In various embodiments, other distance measuring devices may be used in addition to, or in lieu of, a step counter 104. For example, a location identifier 106 may be used to determine the location of the device user. The user's location, and/or a calculated distance traveled to the absolute location, can be determined. For example, one implementation of the location identifier 106 is in the context of satellite assisted position determination systems, such as Galileo or global positioning system (GPS) technology, where the approximate position of the user can be determined if the user is equipped with a satellite signal receiving device, such as a GPS device. Where the user has a GPS device in his/her possession, the user's absolute position based on latitude and longitude can be determined. If a distance traveled is desired, the user's absolute position can be compared to a reference point such as the user's starting point. Thus, GPS may be used to calculate a distance traveled, by comparing a current location with a reference location (e.g., starting location), or may be used to pinpoint a user's location using the GPS coordinates. For example, assuming a virtual route embodiment, a GPS device can determine the user's current "actual" coordinates, and find the distance by comparing the actual current coordinates to the coordinates of the user's starting point. If this distance is, for example, 2.2 km, then 2.2 km along the "virtual" route can be identified. Thus, GPS can be used to determine a distance traveled, so that a route can be mapped on a virtual route. The user can travel in any manner, including but not limited to walking, jogging or other personal physical movement, or utilizing a device or machine such as a bicycle, automobile, boat, aircraft, personal transporter such as a Segway™, or any other vehicle. It should be noted that other location identification system and/or modules capable of determining a user's location, other than GPS, may analogously be used in accordance with the present invention. One alternative is a triangulation using mobile network access points, wherein location information of a mobile communication device is determined in the network and transmitted back to the mobile communication device and/or stored in the network for further use.

The distance measuring devices can be discrete devices, where the output of the device is provided to the mobile device 100. In another embodiment, one or more of the step counter 104, location identifier 106 or other distance measuring devices can be integrally implemented into the mobile device 100, as depicted by dashed line 108. For example, a step counter 104 can be integrally designed into the housing of the mobile device 100. As another example, the step counter 104 may be a modular device that can plug into the mobile device 100, similar to the manner in which a removable memory card can be plugged into the device 100. The step counter 104 may also be a separate device that provides its information to the mobile device 100 via direct connections such as USB, IEEE 1394 (etc.), proximity connections such as infrared, Bluetooth, Wibree™ (etc.), network connections such as cellular and other mobile networks (GSM/GPRS, WLAN, WCDMA, etc.), and the like. Any manner of utilizing one or more of the devices 104, 106 with the mobile device 100 can be implemented in accordance with the present invention.

A step counter can serve as a motivator for someone involved in an exercise program. People are interested in the steps taken, particularly if a daily step total is targeted. However, step counters basically provide the number of steps taken, or the distance traveled based on the step count and an average step length. While this information is of interest to those targeting or recording steps or distances, it is a limited amount of raw information that is otherwise unrelated to the person's surroundings. The present invention enables information provided by devices such as the 104 to be utilized by functionality 110 in mobile devices 100 and/or in application servers 112, and allows enriched visualization and utilization of the data.

The functionality 1 10 making use of the output of step counter 104 or other distance measuring device/system can be implemented in one or more applications 114 or "clients." These applications 114 can be implemented in the mobile device 100 and/or in the application server(s) 112. As will be described in greater below, the distance walked or otherwise traveled by the device user, and the resulting approximate location on an actual or virtual route, can be used in connection with one or more applications 114 to enhance the user's experience. One application 114 is a map/route application 116, which may be a local client or a remote application such as at the application server 112. Other applications may also be used such as, for example, data network connectivity and communication applications 118 (e.g., messaging applications, Internet access applications, etc.), e-commerce applications 120.such as postcard applications 122, etc. These and other applications used with step counter 104 output enhance the user's experience with the step counter 104 or other distance measuring device. To the extent that a step counter 104 helps users in their endeavors to walk, run or otherwise exercise, the enhancements of the present invention provide motivation and add enjoyment to the experience.

Figure 2:
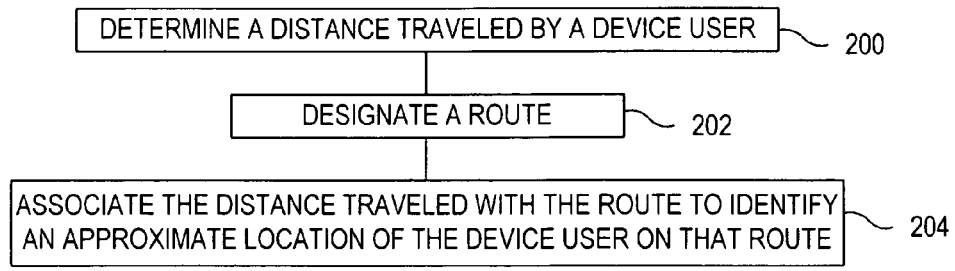
FIG. 2 is a flow diagram illustrating a embodiment of a manner for assimilating mobile device functionality and sensed distances traveled by a person.

FIG. 2 is a flow diagram illustrating one embodiment of a manner for assimilating mobile device functionality and sensed distances traveled by a person. In the embodiment of FIG. 2, a distance traveled by a person is determined 200. The person may be traveling on foot, such as walking or jogging, or may be riding a bicycle, etc. When the user is on foot, a pedometer or other step counter can be used to determine the approximate distance traveled. GPS or other location identification service can be used for users on foot, bicycle, etc. Other sensors can be used, such as an odometer on a bicycle that can provide its output to the mobile device or server via direct connections (e.g., USB; pressure contacts, etc.), proximity wireless connections (e.g., infrared, Bluetooth, Wibree™, etc.), infrastructure-based networks (cellular networks/GPRS, etc.).

A route is designated 202. The route may be designated by the user who will be taking the route, or by another person or entity. As will be described in greater detail below, the route may be an actual route to which the user will substantially follow, or the route may be a virtual route whereby the user can feel as if he/she is following a route different than the route actually being followed. For example, a walking route in Europe would be a virtual route for a user actually walking in the United States. One aspect of the invention allows the user to simulate traveling along a path different than the actual path being traveled. This is accomplished by associating 204 the distance traveled with the designated route to identify an approximate location of the device user on that virtual or actual route. This experience can be enriched by way of additional application features and/or additional applications that are available to the user in connection with or along the virtual or actual route.

Figure 3:
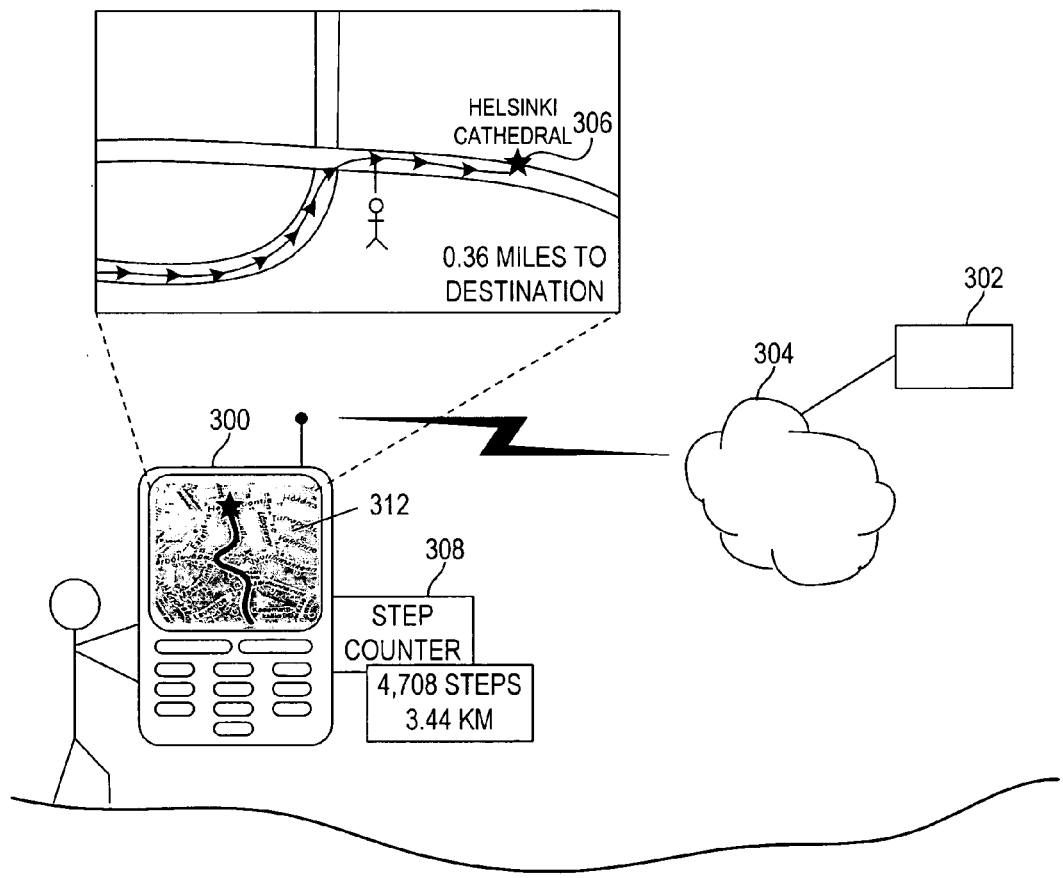
FIG. 3 is a block diagram generally depicting the use of a step counter output with a map/route application residing on a mobile device, or residing on a server and available to the mobile device via a network(s)

One embodiment of the present invention is using the step counter output in connection with a map program. FIG. 3 is a block diagram generally depicting the use of a step counter output with a map/route application residing on a mobile device 300, or residing on a server 302 and available to the mobile device 300 via a network(s) 304. There are numerous manners in which the user can identify the actual or virtual route to follow. For example, the user can identify a destination 306 via the map application, whether it is a map including an actual route to be traveled by the user or a different route on which the user can pretend to be traveling. The user can designate the entire route, such as by drawing the entire path using a stylus and/or touchscreen. The user can identify one or both endpoints of a desired route, or may instead or additionally identify one or more midpoints along a route (where "midpoints" in this sense refers to any point between the origin or destination). In another embodiment, the user can select from a plurality of available virtual routes. This can be initiated by the user, or by the device 300 or server 302. For example, the user may select one of a plurality of available routes, or may specify a desired route whereby the device 300 or server 302 identifies the closest actual route to that specified by the user. As another example, the device 300 or server 302 may prompt the user to specify a route, or a continuation of a route. For example, when the route taken by the user reaches an intersection, fork or other crossing with another route(s) or route portion(s), the device 300 or server 302 can recognize this, alert the user, and prompt the user to enter the desired direction/route to take from that point.

In still another embodiment, the user can select a desired travel distance (e.g., I would like to walk 5 km), and the map/route client can randomly select a route of that distance. Such a "random" selection can be weighted by user-designated attributes, categories, etc. For example, the user can identify information such as a desired country or region (e.g., Europe), or type of area such as mountainous, desert, snow-covered, beach walk, etc. Using this information, one embodiment involves the map/route client can randomly select a virtual route based on the user-designated attributes. Any of these or other manners of identifying the route(s) can be facilitated by the map/route client. Thus, the client can facilitate user selection of a desired virtual route, where the "desired virtual route" includes selection of the entire route or selection of some information (e.g., midpoints, attributes, etc.) which at least in part identifies the desired virtual route.

In one representative example, the user can identify a starting point and the destination 306, and a distance traveled from the origin can be calculated using the step counter 308 output. For example, in the illustrated embodiment the mobile device 300 includes an integral step counter 308 that indicates that the user has taken 4,708 steps since starting the trek. Based on the user's average step length, the step counter 308 (or the device 300 processor using raw output from the step counter) calculates that 3.44 kilometers have been traveled. The route traveled, and/or the user's current location, can be depicted on the map via a display 312 of the mobile device 300. As the user continues traveling, and the step counter 308 continues to indicate further distances traveled, the user's location on the map can be updated.

The "map" can be any geographic representation in which a distance is a relevant factor. As previously indicated, the map can represent the actual route that is to be taken by the user, such as a round trip between the user's home and another geographic location or landmark. In one embodiment, the route selected is a virtual route. One type of virtual route is an actual existing route, but not the actual route taken by the user. For example, the user may want to walk a route, over a course of days, weeks, months, etc., from one far away place to another. In another example, the user may want to simulate a walk within a city, such as Paris. The user can set a destination, or a route, to walk "in Paris" such that the distance walked at the actual location gets input to the virtual route within Paris, thereby seeming that the user is walking through Paris.

Another type of virtual route is one that would not be an actual route for a person to walk, but would give an interesting reference of how far a person walked in a period of time (e.g., days, weeks, months, years). For example, one selected route may be the circumference of the moon, which the user would obviously not walk in reality, but can engage in a virtual walk around the moon over a period of years using the coordinated mapping function and step counter of the present invention. While making this trek, the user can be presented with information about the craters and other information of interest proximate the user's "virtual" location along the route.

Figure 4:
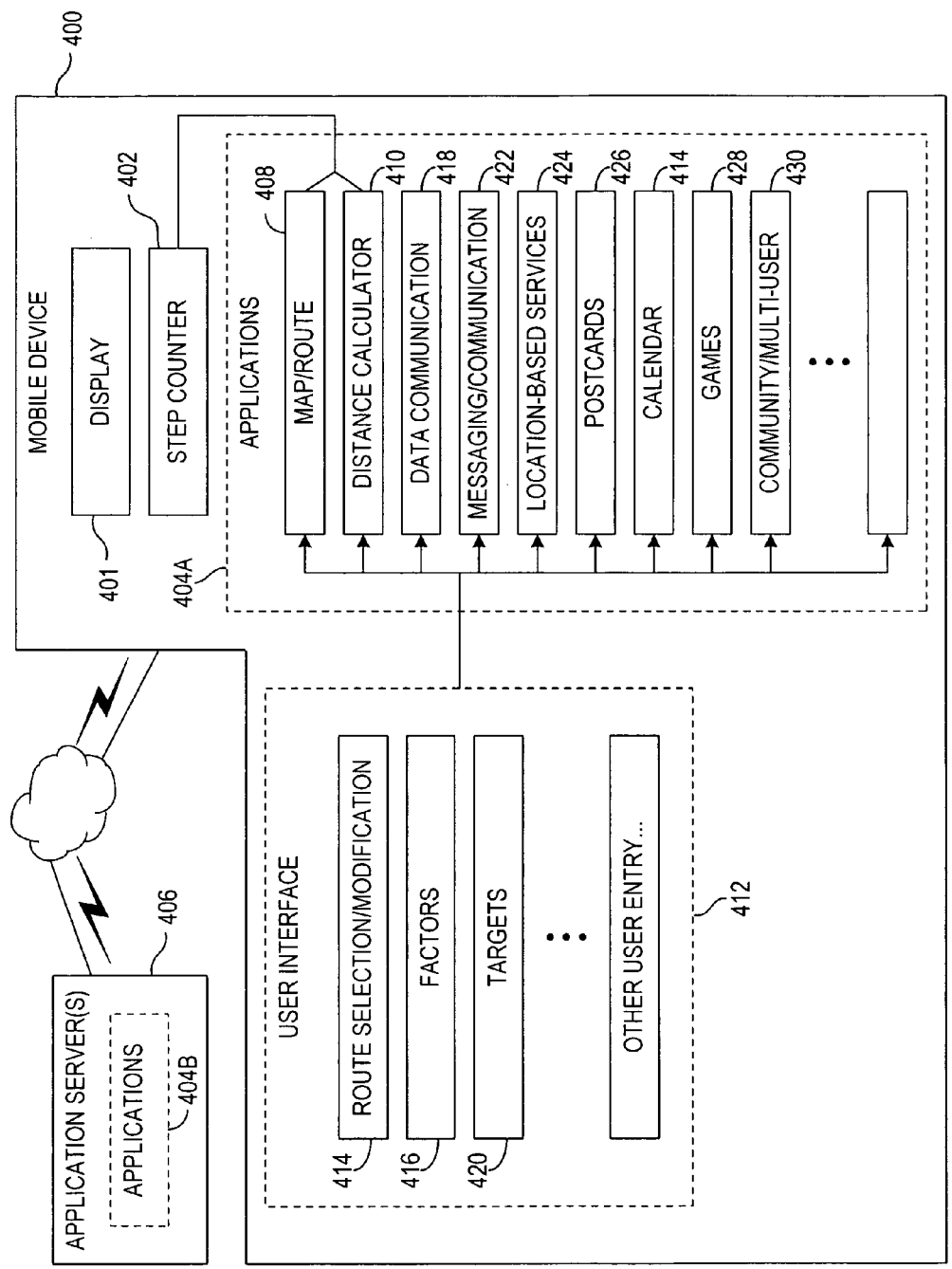
FIG. 4 illustrates some features of the map/route application(s) that can be used along the user's actual or virtual trip.

The coordinated mapping and step counter functions of the present invention can help motivate a user to more fully and/or more frequently walk, run, hike, etc., by providing variety to the user in his/her simulated travels through an interesting and/or educational place. FIG. 4 illustrates some features of the map/route application (or discrete applications) that can be used along the user's actual or virtual "trip." It should be recognized that the application examples described below are provided as representative examples of applications and/or functionality that may be used in connection with the present invention, and do not represent an exhaustive list. Thus, as those skilled in the art may ascertain from the description and teachings provided herein, other functionality may also be used in connection with the present invention.

In the embodiment of FIG. 4, the mobile device 400 includes a step counter(s) 402, and one or more applications 404A. Any one or more of the applications 404A may instead, or additionally, be hosted by a server(s) 406 as depicted by applications 404B. The map/route application 408 represents a module, such as a software module, operable in connection with a processing system to present map segments and routes on the map. The map/route application (hereinafter the "map application" or "map client") may locally reside on the mobile device 400, or as previously indicated may be hosted by a server 406 or other networked computing system.

For example, the server 406 may represent or otherwise include a map server wherein the mobile device 400 is interoperable with the map server 406 to obtain, for example, geographical information from the map server 406 for presentation via the mobile device 400. Such a map server 112 can therefore enable a map or map segment to be displayed on a display 401 of the mobile device 400. The mobile device 400 may submit data requests to the map server 406 in any known manner. The user can identify or otherwise enter points on the map such as a starting point, destination, preferred route, alternate route(s), etc. Various entry mechanisms may be used, including graphical user interface (GUI), text entry, menus, touchscreen technology, voice commands, etc. For example, a touchscreen may to allow the user to touch or drag on the screen to show points and/or paths. Text entry may be used for entering latitude/longitude coordinates, landmarks, intersections, addresses, etc. Any user entry mechanism may be utilized, whether the map client 408 is provided via the mobile device 400 or the server(s) 406.

The step counter 402 may include the circuitry to calculate distances from a number of steps taken. For example, the step counter 402 may allow the user to input an average step length or distance, and the step counter 402 multiples the number of counted steps and the average step length to arrive at the distance traveled. In another embodiment the step counter 402 provides a count output, which is processed by a local processing system (not shown) and an application such as the distance calculator application/client 410. The distance calculator client 410 can calculate the traveled distances by, for example, multiplying an average footstep length by the number of steps taken. The location of the particular circuitry that performs the distance calculation is not relevant, but rather that a distance measuring module is provided to ultimately calculate the distance traveled.

The map client 408 and distance calculator 410, whether discrete applications, an integrated application, or features of a common application, enable users to track their progress on the map. The map client 408 and/or distance calculator 410 can be aware of the scale of the current map, such that a distance walked can be properly indicated on that map by knowing the current scale (e.g., 2 cm equals 1 km). As previously indicated, the map may be a map of the actual route to be taken, or may be a map of a route that the user is pretending to be navigating, or even an imaginary route. In one embodiment, the user is allowed to enter information by way of a user interface (UI) 412. The UI 412 can include any one or more of graphical user interface (GUI), text entry, menus, touchscreen technology, voice commands, etc. By way of the UI 412, the user can engage in, for example, route selection and modification 414. The target location can be selected, the origin may be selected (or determined via GPS or otherwise), the desired route between the origin and destination can be selected, etc. If desired, the user can also change the route along the way. For example, if the user is walking a virtual route in Finland, the user can change the virtual route to one in Sweden, where the distance traveled may be applied to the new route in Sweden. The user may also change the route to the same destination, i.e., change the proposed path in which the user will ultimately reach the destination. In one embodiment, the user's progress is shown on the map as the user travels the route, which can be effected due to the calculation of the distance traveled from a point of origin. In still other embodiments, a target destination may be selected, and the map/route client can present recommendations of alternative routes in which the user can make a selection.

The user may set "targets" along the route via the route selection and modification 414 inputs, such as setting the next village as a target. For example, the user can try to reach the next village "target" within a particular time. As another example, the user may set a reminder to occur when a target is reached, which may or may not be used in connection with a calendar client 414 or other reminder/alarm application. Another embodiment is to set an exercise target, such as a certain kilometers per day, such that if the user wants to walk 5 kilometers, the route can indicate where along the route the user would have to travel to reach this goal.

In other embodiments, the distance calculator 410 takes other factors 416 into consideration in the calculation of the distance traveled. These factors may be manually entered via the UI 412, or may be automatically input. For example, altitude contours can be considered, whereby a measured distance is reduced by a proportion if the user is walking uphill, based on the assumption that the user will not walk the same speed and/or take as large of steps when walking uphill and/or consumes more energy. When walking downhill, the reverse may occur whereby the measured distance is increased proportionately to the downhill degree. Other factors can also be considered to adjust the calculated distance that the user travels, such as whether the walking surface is hard and smooth (e.g., a paved road), or is encumbered with obstacles or otherwise rough terrain (e.g., a field). The user may enter this information, or the map data or other data may include information on the altitude contours, terrain, etc. In another example, if the altitude of the selected route is, for example, more that 2000 m, the system may adjust the calculated distance according to that factor, i.e. the higher altitude the more steps/energy are needed to proceed on the selected route, e.g., to the summit of Mount Everest.

In accordance with various embodiments of the invention, still further functionality and/or applications can be implemented to further enhance the usability and desirability of the mapping/routing functionality. For example, while the user is on his/her "trip," the application can offer the possibility to download data related to a location(s) along the route. As an example, the user may have selected an imaginary route to walk through the city of Paris. The selected route may pass by, for example, the Arc de Triomphe and the Eiffel Tower. In accordance with one embodiment of the invention, when the user reaches such landmarks (any landmark, selected landmarks, etc.), data can be communicated to the mobile device 400. A data communication client 418 can be provided to facilitate this data download. The data communication client 418 can include a browser to retrieve and view data regarding the landmarks. While a browser typically involves "pull" technology, the data communication client 418 may also be such that it handles "push" technology whereby the data is automatically provided to the mobile device 400 when the user reaches the landmark(s) or established target(s). The device 400 can determine the user's current location based on the map/route and distance calculator clients 408, 410.

The data downloaded may be any type of data associated with the route. A target(s) 420 or other point of interest may be designated by the user on the route, and when reaching a particular (and in some embodiments approximate) proximity to a particular one of the designated targets, information may be provided to the user. This can apply to points of interest that are not "designated" by the user as well, such as a time zone. For example, when the user reaches a time zone boundary, data may be automatically presented to the user such as a notification of a change in time.

Whether or not the targets are known points of interest (e.g., time zone boundary, borders between geographic areas such as counties, states, countries, etc.) or user-designated targets 420, various data can be downloaded to the user's device 400 to enhance the user's experience. For example, when reaching a village on the route, a local village webcam feed can be provided to the user to show a live view of the village that the user has entered on his/her imaginary walking journey. Other types of media/multimedia of the village can be provided, such as recorded video, images of the village, recorded historical audio and/or text, etc. Information on scenic views, demographics, village history, restaurant menus, local newspapers, local walking trails are merely representative types of information that can be provided to the user when reaching an area. Any audio, video, text, images, or other media/multimedia can be provided to the mobile device 400. This may give the user the feeling that he/she is actually walking through these areas, while being educated on areas perhaps otherwise unfamiliar to the user.

These types of information may similarly be provided to the user when on a route that the user is actually traveling. For example, the user may receive information (e.g., hours of operation, menu, seating wait time, etc.) regarding a nearby restaurant when approaching the restaurant. In one embodiment, a user traveling a virtual route can obtain actual location-based services 424 from a target 420 or other marked point along the virtual route. For example, when reaching a Paris restaurant while walking a virtual route, the user may be presented with information (e.g., hours of operation, menu, seating wait time, etc.) that an actual passerby near the Paris restaurant might receive via location-based services. A location-based services client 424 may be provided to notify the actual establishment's website (e.g., the Paris restaurant) that a user has entered the proximity, even though in actuality the user has only entered the proximity via the virtual route.

In accordance with other embodiments of the invention, messaging and other communication clients 422 can be implemented. Messaging/communication applications 422 may include, for example, e-mail, short message service (SMS) and other text messaging, instant messaging (IM), multimedia messaging service (MMS), etc. In one embodiment, such messages are constructed to appear as if they have been sent from a location along a virtual route. In another embodiment, a message may be sent from one user to another user in a group of walkers. In such a case, the messaging/communication application 422 can provide templates for the user, and can address the message(s) to other users in the group.

In another embodiment, the users e-mail address, SMS, MMS, alias or other contact information can be presented somewhere at the actual location when the user reaches the same, but virtual, location. For example, a person(s) at the actual location (e.g., Helsinki) may be registered for the same service as a user in the U.S., and has indicated that he/she wants to be notified when another registered user is taking a virtual walk through his/her city. In this manner, the user could communicate with a person(s) who is at the actual location. An example is a user actually walking in the U.S., but taking a "virtual" trip in Finland in accordance with the invention. A person in Helsinki is registered with a service implementing the present invention. When the user walking in the U.S. reaches Helsinki via the virtual route, other registered users in Helsinki (who have, for example, opted to receive notifications when another registered user enters Helsinki via a virtual route) can send a "greetings" message to the user walking the virtual route.

One embodiment involves a message or otherwise uploading information to blogs, websites or other applications. One example is for a user to upload a quantity of walked kilometers to a blog or website. Another example is for the user to send the quantity of walked kilometers to a calorie-counting application, whereby a number of calories burned can be calculated from the quantity of walked kilometers.

Other exemplary applications could be a game, where the map is a game 428 environment. For example, multiple users can each opt for a particular virtual route on a displayed map, and can then race to respective endpoints or a common endpoint. In a gaming environment, the "routes" may be other types of routes, such as a racetrack, airways, etc.

One application that may be used with natural or designated target points is a postcard service 426. The user on the virtual route may be offered the possibility to send a postcard to a contact. The postcard can relate to an actual location reached by the user along the virtual route. Automatic or manual initiation of a postcard transaction can be implemented. For example, the user can indicate in advance that upon reaching Helsinki along a virtual walking route, a postcard of Helsinki will be sent to one or more contacts. The postcard may be a physical postcard, or an electronic postcard. In a physical postcard embodiment, the actual postcard may be sent from a post office in the actual location (e.g., Helsinki in the present example), or from a local post office relative to the user's actual location.

The applications 404A/404B can also include a community/multi-user feature or application 430. Several persons on their way to the same virtual destination on the same virtual route, or to a different virtual destination, could "meet" along the way. For example, the system can calculate the distances traveled along each route, and notify users who pass the same approximate point, or when they pass one another along the route. The users can leave personal profile information, information of interest regarding the location, or other information along the route for other users to find. In one embodiment, the user leaves a "tag" that provides a visual or other indication to other users that information is available at a location along the route. In another embodiment, first users can identify their virtual route taken, which can be provided to a second user(s) who may want to follow the first user or simply follow the same route taken by the first user.

In one embodiment, a multi-user or group application involves a map/route server providing a central group application that monitors each of the users associated with the group. This may be accomplished in various manners, including the use of presence servers. In another embodiment, a blog (or analogous) can be used to receive location information from the maps, and podcasting (or analogous) can be used to deliver location information to other users. Communication between the server and the users can be via WLAN, Bluetooth, Wibree™, cellular networks, SMS, MMS, formatted web feeds such as really simple syndication (RSS) or Atom, or any other similar manner.

Figure 5:
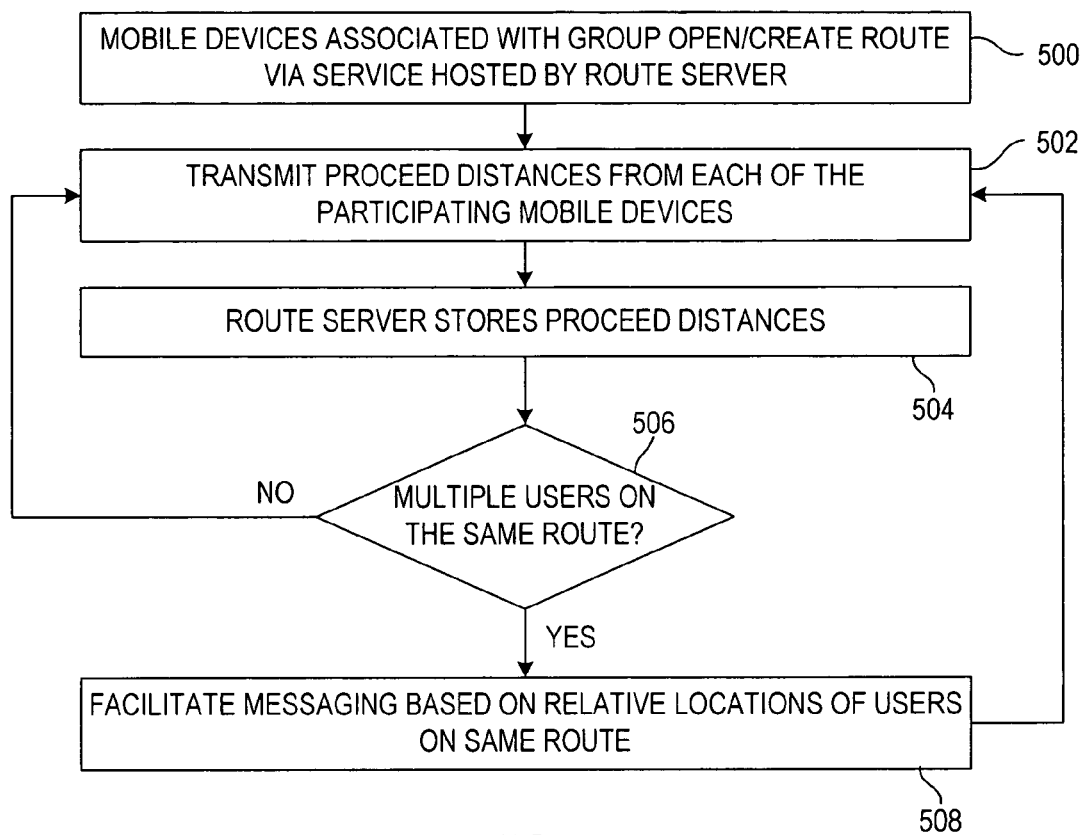
FIG. 5 is a flow diagram illustrating one embodiment of a method for group application in accordance with the invention.

FIG. 5 is a flow diagram illustrating one embodiment of a method for group application in accordance with the invention. The route server provides a map/route service, and mobile devices associated with the group open or create 500 a route using the service hosted by the route server. The mobile devices associated with the group transmit 502 their respective proceed distances to the route server, which may store 504 these proceed distances. In one embodiment, if the route server determines 506 that multiple users are on the same route, the route server facilitates 508 messaging or other communication based on the relative locations of the users on the same route.

For example, the server can assist in the transmission of messages from a first user to a second user(s) along the route at selected points. These messages may be left at points along the route for the other users to read, view or otherwise consume when they reach the selected points. Such messages may be left for all other participating users of the group, or certain users selected by the user leaving the message. These messages may be in any form, such as text, images, video, etc. Messages may be transmitted to the other users when the respective one of the other users reaches the specific point on the route (e.g., message left by user-1 transmitted to user-2 when user-2 reaches the specific point). In another embodiment, the message from one user may be transmitted to a second user when one of the other users reach the specific point(s) on the route (e.g., message left by user-1 transmitted to user-2 when user-3 or user-4 reaches the specific point). In another embodiment, a message is transmitted when two or more users actually pass one another along the route. In other embodiments, group communication can be created when two or more users have reached the same location. Such group communication can be effected in any known manner, such as using session initiation protocol (SIP), push-to-talk over cellular (PoC) optionally used in connection with a presence service, etc.

It should be noted that when referring to a map/route server, this need not necessarily be a separate server accessible via the network(s). While one embodiment indeed does involve such a separate server system, other embodiments involve the use of one of the user devices operating as a master device running the route server application(s).

Figure 6:
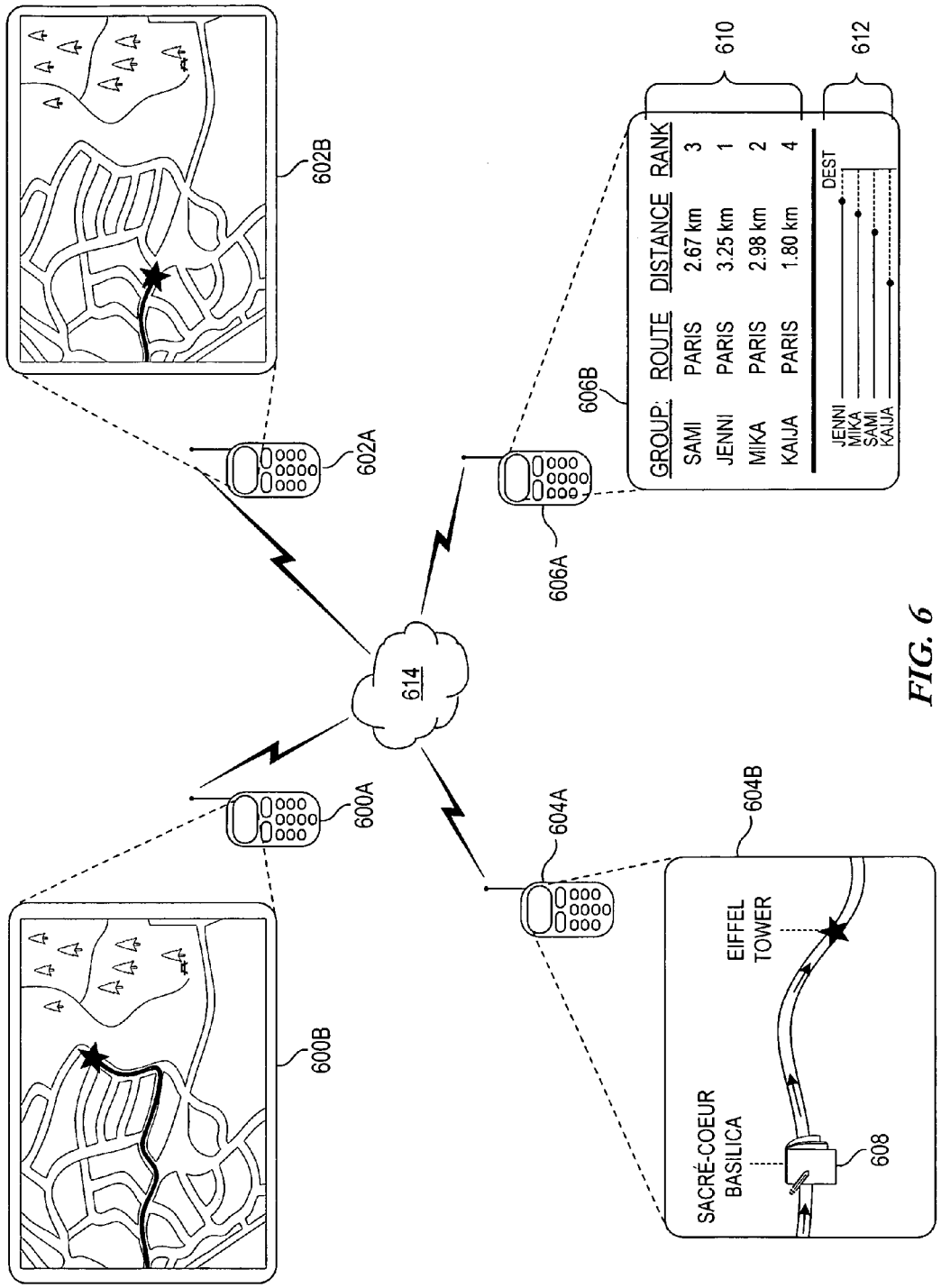
FIG. 6 illustrates a general use case of a group application in accordance with one embodiment of the invention.

FIG. 6 illustrates a general use case of a group application in accordance with one embodiment of the invention. The embodiment of FIG. 6 illustrates a "travel by exercising" embodiment, where multiple users walk, jog, run, or otherwise travel along a route, which is assumed to be a virtual route in the embodiment of FIG. 6. The embodiment of FIG. 6 assumes four users, represented by their respective mobile devices 600A, 602A, 604A, 608A, each having a respective display 600B, 602B, 604B, 608B. While a display is illustrated, some or all of the information may be presented in other/additional manners, such as via audio. Further, many of the features described in connection with FIG. 6 are also applicable in single-user embodiments.

The devices 600A, 602A show the progress made by the respective users. The respective displays 600B, 602B of the devices 600A, 602A present a map segment showing the route on which the respective user is taking, and the current position identified by a star symbol. The applications can provide other views, such as the closer view shown at the display 604B. The display 604B also illustrates an exemplary "tag" or target 608. As previously described, a tag may be left along or otherwise positioned on a route, where the tag provides an indication to other users that information is available at that location along the route. Tags may also be left for other purposes, such as where a first user wants to show second-following users which path the first user took towards a destination. In the illustrated multi-user embodiment, a route server can record such tag locations, and determine when other users reach a position proximate the tag. The contents of the tag can be presented to the second users who reach the tag, where the contents can be any type of information, including a text note, image, video clip, audio clip, link, etc. The tag can also be provided by service providers and/or the route server, such as historical information regarding the site, marketing information by advertisers, etc. Users may opt to turn on or turn off such external tags, or may filter such external tags and view only certain categories (e.g., historical information and/or images of the upcoming landmarks).

Other views may be provided in a multi-user embodiment to enhance the group experience. Display 606B illustrates one representative screen of information that may be available in such a group embodiment. The progress of the members of the group may be collected and displayed in one or more formats, such as depicted by display segments 610 and 612. Still other views and information may be provided.

The devices 600A, 602A, 604A, 608A can communicate by any networking 614 arrangement, including but not limited to peer-to-peer networking, infrastructure-based networking (e.g., cellular communications, such as GSM/GPRS), WLAN (e.g., such as might be present in a mall for mall walkers), etc.

Figure 7:
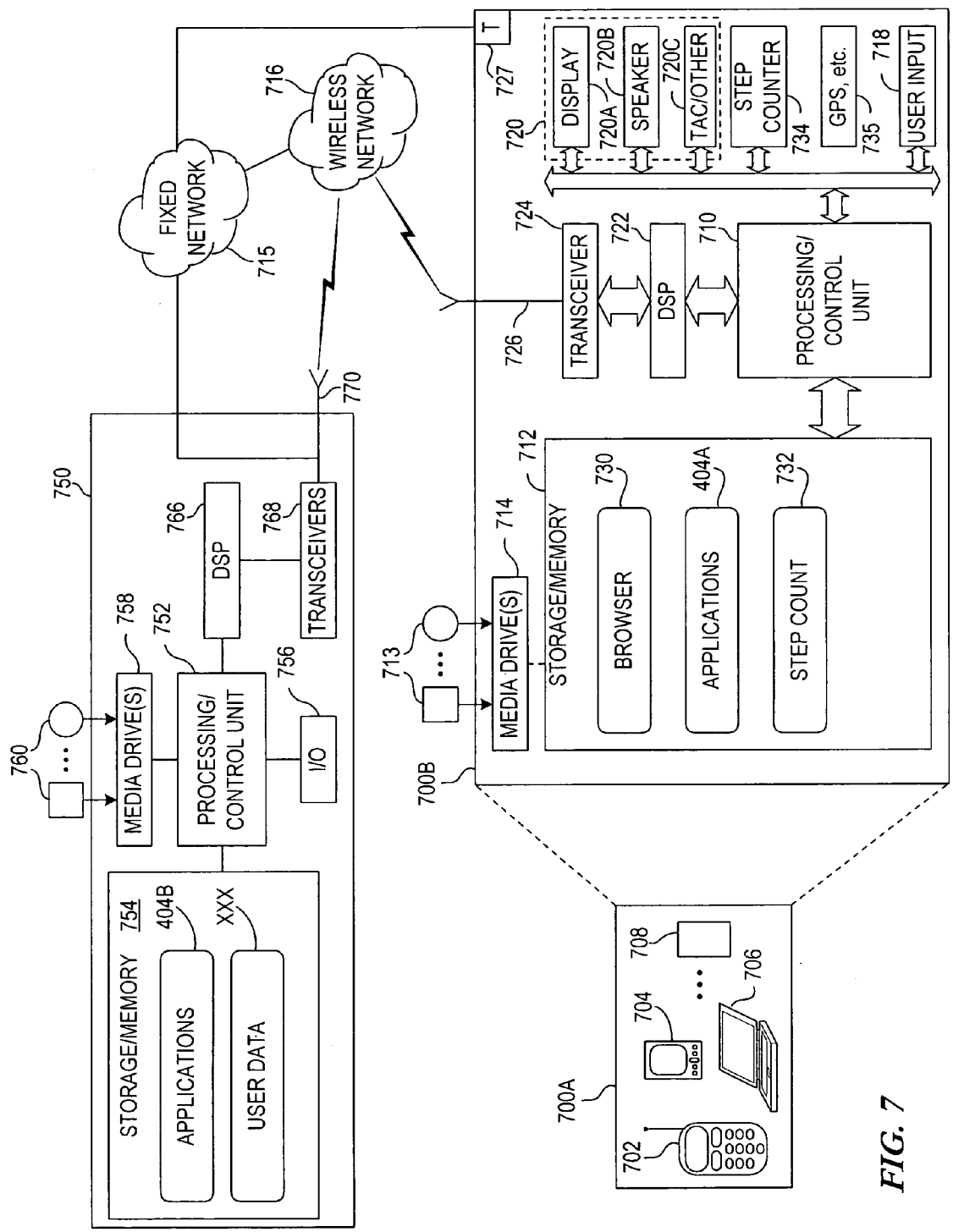
FIG. 7 illustrates a system in which the present invention may be implemented or otherwise utilized.

A system in which the present invention may be implemented or otherwise utilized is illustrated in FIG. 7. The communication device(s) 700A represents any communication device capable of performing the device/handset functions previously described. In the illustrated embodiment, the device 700A represents a mobile device capable of communicating over-the-air (OTA) with wireless networks and/or capable of communicating via wired networks. By way of example and not of limitation, the device 700A includes mobile phones (including smart phones) 702, personal digital assistants 704, computing devices 706, and other networked terminals 708.

The terminal 700A utilizes computing systems to control and manage the conventional device activity as well as the device functionality provided by the present invention. For example, the wireless terminal 700B includes a processing/control unit 710, such as a microprocessor, controller, reduced instruction set computer (RISC), or other central processing module. The processing unit 710 need not be a single device, and may include one or more processors. For example, the processing unit may include a master processor and one or more associated slave processors coupled to communicate with the master processor.

The processing unit 710 controls the basic functions of the terminal 700B as dictated by programs available in the program storage/memory 712. The storage/memory 712 may include an operating system and various program and data modules associated with the present invention. In one embodiment of the invention, the programs are stored in non-volatile electrically-erasable, programmable read-only memory (EEPROM), flash ROM, etc., so that the programs are not lost upon power down of the terminal. The storage 712 may also include one or more of other types of read-only memory (ROM) and programmable and/or erasable ROM, random access memory (RAM), subscriber interface module (SIM), wireless interface module (WIM), smart card, or other fixed or removable memory device/media. The programs may also be provided via other media 713, such as disks, CD-ROM, DVD, or the like, which are read by the appropriate interfaces and/or media drive(s) 714. The relevant software for carrying out terminal operations in accordance with the present invention may also be transmitted to the terminal 700B via data signals, such as being downloaded electronically via one or more networks, such as the data network 715 or other data networks, and an intermediate wireless network(s) 716 in the case where the terminal 700A/700B is a wireless device such as a mobile phone.

For performing other standard terminal functions, the processor 710 is also coupled to user input interface 718 associated with the terminal 700B. The user input interface 718 may include, for example, a keypad, function buttons, joystick, scrolling mechanism (e.g., mouse, trackball), touch pad/screen, or other user entry mechanisms (not shown).

A user interface (UI) 720 may be provided, which allows the user of the terminal 700A/B to perceive information visually, audibly, through touch, etc. For example, one or more display devices 720A may be associated with the terminal 700B. The display 720A can display web pages, images, video, text, links, maps and routes in accordance with the invention, and other information. A speaker(s) 720B may be provided to audibly present instructions or other information. Other user interface (UI) mechanisms can also be provided, such as tactile (TAC) 720C or other feedback. The information associated with the present invention may be provided by any type of presentation perceivable by the user.

The exemplary mobile device 700B of FIG. 7 also includes conventional circuitry for performing wireless transmissions over the wireless network(s) 716. The DSP 722 may be employed to perform a variety of functions, including analog-to-digital (A/D) conversion, digital-to-analog (D/A) conversion, speech coding/decoding, encryption/decryption, error detection and correction, bit stream translation, filtering, etc. The transceiver 724 includes at least a transmitter and receiver, thereby transmitting outgoing radio signals and receiving incoming radio signals, generally by way of an antenna 726. Where the device 700B is a non-mobile or mobile device, it may include a transceiver (T) 727 to allow other types of wireless, or wired, communication with networks such as the Internet. For example, the device 700B may communicate via a proximity network (e.g., IEEE 802.11x or other wireless local area network), which is then coupled to a fixed network 715 such as the Internet. Peer-to-peer networking may also be employed. Further, a wired connection may include, for example, an Ethernet connection to a network such as the Internet. These and other manners of ultimately communicating between the device 700A/B and the map/route server 750 may be implemented.

In one embodiment, the storage/memory 712 stores the various client programs and data used in connection with the present invention. For example, the storage/memory 712 includes storage to store clients/applications such as the browser 730, and one or more of the applications 404A previously described in connection with FIG. 4, and/or other applications. Data may also be stored, such as a step count 732 as determined by the step counter 734, and/or calculated distances traveled by the device 700A/B user. As previously indicated, GPS and/or other systems 735 may instead or additionally be provided to obtain data that can be used to calculate a distance traveled by the device 700A/B user.

It should be recognized that the client modules 404A may be separate modules operable in connection with the processor 710, may be single module performing each of these functions, or may include a plurality of such modules performing the various functions. These software/firmware modules therefore may or may not reside in the same software/firmware program. It should also be recognized that one or more of these functions may be performed using hardware. For example, a compare function may be performed by comparing the contents of hardware registers or other memory locations using hardware compare functions. These client and data modules are representative of the types of functional and data modules that may be associated with a terminal in accordance with the invention, and are not intended to represent an exhaustive list. Also, other functions not specifically shown may-be implemented by the processor 710.

FIG. 7 also depicts a representative computing system 750. One or more of such systems 750 may be available via a network(s) such as the wireless 716 and/or fixed network 715. In one embodiment, the computing system 750 represents the map/route server as previously described. The server system 750 may be a single system or a distributed system. The illustrated computing system/server 750 includes a processing arrangement 752, which may be coupled to the storage/memory 754. The processor 752 carries out a variety of standard computing functions as is known in the art, as dictated by software and/or firmware instructions. The storage/memory 754 may represent firmware, media storage, and/or memory. The processor 752 may communicate with other internal and external components through input/output (I/O) circuitry 756. The computing system 750 may also include media drives 758, such as hard and floppy disk drives, CD-ROM drives, DVD drives, and other media 760 capable of reading and/or storing information. In one embodiment, software for carrying out the operations at the computing system 750 in accordance with the present invention may be stored and distributed on CD-ROM, diskette, magnetic media, removable memory, or other form of media capable of portably storing information, as represented by media devices 760. Such software may also be transmitted to the system 750 via data signals, such as being downloaded electronically via a network such as the data network 715, Local Area Network (LAN) (not shown), wireless network 716, and/or any combination thereof.

In accordance with one embodiment of the invention, the storage/memory 754 and/or media devices 760 store the various programs and data used in connection with the present invention. For example, the single or distributed map/route server 750 includes applications 404B, as previously described in connection with FIG. 4. Other data may also be stored, such as user data, including step counts, distances traveled, and/or other information associated with individual users and/or user groups.

The illustrated computing system 750 also includes DSP circuitry 766, and at least one transceiver 768 (which is intended to also refer to discrete transmitter/receiver components). While the server 750 may communicate with the data network 715 via wired connections, the server may also/instead be equipped with transceivers 768 to communicate with wireless networks 716 whereby an antenna 770 may be used.

Hardware, firmware, software or a combination thereof may be used to perform the functions and operations in accordance with the invention. Using the foregoing specification, some embodiments of the invention may be implemented as a machine, process, or article of manufacture by using standard programming and/or engineering techniques to produce programming software, firmware, hardware or any combination thereof. Any resulting program(s), having computer-readable program code, may be embodied within one or more computer-usable media such as memory devices or transmitting devices, thereby making a computer program product, computer-readable medium, or other article of manufacture according to the invention. As such, the terms "computer-readable medium," "computer program product," or other analogous language are intended to encompass a computer program existing permanently, temporarily, or transitorily on any computer-usable medium such as on any memory device or in any transmitting device.

For example, one embodiment of the invention includes a computer-readable medium having instructions stored thereon that are executable by a computing system for enhancing the usability of distance measuring devices. Execution of the instructions allow at least one route to be presented via a mobile device. The instructions determine a distance traveled by a user of the mobile device, such as by calculating a distance from a step count, or converting a received distance value to the proper format for further processing. The executed instructions further associate the distance traveled with the presented route to indicate an approximate location of the user on the presented route. Computer-executable instructions may analogously be executed by a processing system on a network element such as a map/route server, where method steps can be executed via a software/firmware-based processing system.

From the description provided herein, those skilled in the art are readily able to combine software created as described with appropriate general purpose or special purpose computer hardware to create a computing system and/or computing subcomponents embodying the invention, and to create a computing system and/or computing subcomponents for carrying out methods of the invention.

The foregoing description of exemplary embodiments of the invention has been presented for the purposes of illustration and description. It is not intended to be exhaustive or to limit the invention to the precise form disclosed. Any/many modifications, combinations and variations of embodiments are possible in light of the above teaching. For example, in the context of imaginary routes, the actual distance traveled can be by way of any means of travel (e.g., walking, running, driving, boating, etc.), whereby the actual distance traveled is depicted as imaginary travel along the imaginary path. An actual distance traveled for use on an imaginary route can be by any distance traveling means, such as a pedometer, GPS calculation, odometer, etc. It is intended that the scope of the invention be limited not with this detailed description, but rather determined by the claims appended hereto.

What is claimed is:

1. A method comprising:
    causing, at least in part, actions that result in presentation of at least one route via a mobile device;
    determining a distance traveled by the mobile device; and
    associating the distance traveled with the presented route to indicate an approximate location of the device on the presented route,
    wherein the presented route corresponds to a virtual route different from an actual route physically traveled, and
    at least one of a starting location and a destination location of the virtual route is different from a starting location and a destination location of the actual route.

2. The method of claim 1, further comprising: causing, at least in part, actions that result in presentation on the mobile device of progress along the virtual route made by other mobile devices that are actually and virtually travelling on the virtual route.

3. The method of claim 1, further comprising facilitating user modification from a current virtual route to a new virtual route, and applying the distance traveled to the new virtual route.

4. The method of claim 1, further comprising invoking a communication application to enable user communication appearing to a recipient to originate from a location along the virtual route.

5. The method of claim 1, further comprising facilitating user selection of at least a portion of the virtual route in which the travel will be simulated.

6. The method of claim 1, further comprising facilitating user modification of the virtual route to be traveled to the destination.

7. The method of claim 1, wherein determining a distance traveled comprises approximating the distance traveled using a step counter.

8. The method of claim 1, wherein determining a distance traveled comprises approximating the distance traveled by comparing a current location with the starting location.

9. The method of claim 8, wherein comparing the current location with the starting location comprises comparing global positioning system (GPS) coordinates of the current and starting locations.

10. The method of claim 1, wherein associating the distance traveled with the presented route comprises superimposing a progressive visual course on the presented route substantially corresponding to the distance traveled along the presented route.

11. The method of claim 1, wherein presenting at least one route via a mobile device comprises presenting a map segment including one or more available virtual routes, and wherein associating the distance traveled with the presented route comprises depicting a traveled distance on a selected one of the available virtual routes.

12. The method of claim 11, further comprising facilitating user selection of one of the available virtual routes to identify the selected one of the available routes.

13. The method of claim 1, further comprising presenting information when the device reaches a marked point along the virtual route.

14. The method of claim 13, further comprising facilitating user designation of one or more marked points.

15. The method of claim 13, further comprising invoking a data connectivity application when the device reaches the marked point along the virtual route, and presenting the information obtained via the data connectivity application.

16. The method of claim 1, further comprising invoking a postcard application to initiate dispatch of a postcard corresponding to a vicinity along the virtual route.

17. The method of claim 1, wherein determining the distance traveled comprises adjusting the distance traveled in view of altitude contours of the actual route traveled.

18. The method of claim 1, further comprising invoking a communication application to initiate communication to another device corresponding a marked point on the virtual route.

19. An apparatus comprising:
at least one processor; and
at least one memory including computer program code,
the at least one memory and the computer program code configured to, with the at least one processor, cause the apparatus to perform at least the following,
determine a distance traveled along a route by a mobile device;
determine an approximate location relative to the route based on the distance; and
cause, at least in part, actions that result in presentation on the mobile device of the route and at least the approximate location relative to the route,
wherein the presented route corresponds to a virtual route different from an actual route physically traveled, and
at least one of a starting location and a destination location of the virtual route is different from a starting location and a destination location of the actual route.

20. The apparatus of claim 19, wherein the apparatus is further caused to cause, at least in part, actions that result in presentation on the mobile device of progress along the virtual route made by other mobile devices that are actually and virtually travelling on the virtual route.

21. The apparatus of claim 19, wherein the apparatus is further caused to provide the distance as a distance traveled relative to the starting location.

22. The apparatus of claim 19, wherein the apparatus is further caused to provide the distance as a step count by a user relative to the starting location, and to calculate the distance traveled by the user based on the step count and a step length of the user.

23. The apparatus of claim 19, wherein the apparatus is further caused to provide the distance as coordinates of a user's current physical location, and to calculate the distance traveled by determining the difference between the coordinates of the user's current physical location and coordinates of a reference location.

24. The apparatus of claim 23, wherein the apparatus comprises a global positioning system (GPS) receiver.

25. The apparatus of claim 19, the apparatus is further caused to enable user communication appearing to a recipient to originate from a location along the virtual route.

26. The apparatus of claim 19, the apparatus is further caused to enable at least the receipt of data at the apparatus in response to the apparatus reaching a location on the virtual route.

27. The apparatus of claim 26, the apparatus is further caused to allow a user to mark one or more locations on the virtual route in which to receive the data.

28. The apparatus of claim 19, the apparatus is further caused to initiate dispatch of a postcard corresponding to a vicinity along the virtual route.

29. A method comprising:
causing, at least in part, actions that result in reception of route selection data and travel distance data from a first device;
determining a distance traveled by the first device based on the received travel distance data; and
causing, at least in part, actions that result in provision of a map segment to the first device, the map segment including at least one virtual route that is identified using the route selection data and that is different from an actual route physically traveled, and the map segment also including an identification of an approximate location on the at least one virtual route corresponding to a current actual location of the first device based on the distance traveled,
wherein at least one of a starting location and a destination location of the virtual route is different from a starting location and a destination location of the actual route.

30. The method of claim 29, further comprising causing, at least in part, actions that result in reception of updates of the travel distance data, determining an updated distance traveled by the first device, and providing an updated map segment to the first device, wherein the map segment identifies on the at least one virtual route the approximate location of the first device based on the updated distance traveled.

31. The method of claim 29, wherein providing a map segment comprises providing map segment including the at least one identified virtual route and a depiction of the distance traveled in view of a known scale of the map segment.

32. The method of claim 29, wherein determining a distance traveled comprises using the user travel distance data directly as the distance traveled.

33. The method of claim 29, further comprising causing, at least in part, actions that result in reception of a step length value, wherein the travel distance data comprises a step count, and wherein determining a distance traveled comprises calculating a mathematical product of the step length and the step count.

34. The method of claim 29, wherein the travel distance data comprises coordinates of the current actual location of the first device, and wherein determining a distance traveled comprises comparing the coordinates of the current actual location of the first device with coordinates of the starting location of the actual route.

35. The method of claim 29, wherein:
causing, at least in part, actions that result in reception of route selection data and travel distance data from a first device and one or more second devices;
determining a distance traveled by each of the first and second devices; and
causing, at least in part, actions that result in provision of a map segment to the first and second devices, the map segments including routes identified using the respective route selection data and respective current locations of the first and second devices based on the respective distances traveled.

36. The method of claim 35, further comprising determining if any of the devices among the first and second devices are traveling on a common actual or virtual route, and transmitting at least one message between the devices determined to be on a common actual or virtual route.

37. The method of claim 35, further comprising determining if any of the devices among the first and second devices reach a marked location on an actual or virtual route, and transmitting at least one message to one or more of the other devices in response thereto.

38. The method of claim 35, further comprising facilitating communication between any of the first and second devices.

39. The method of claim 35, further comprising initiating group communication between any two or more of the first and second devices when the two or more of the first and second devices are within a predetermined location on the route from one another.

40. An apparatus comprising:
at least one processor; and
at least one memory including computer program code, the at least one memory and the computer program code configured to, with the at least one processor, cause the apparatus to perform at least the following,
cause, at least in part, actions that result in reception of route selection data and travel distance data from one or more communication devices;
identify actual or virtual travel routes for each of the one or more communication devices in response to the received route selection data, and calculate actual distances traveled by each respective one or more of the communication devices in response to the received travel distance data; and
cause, at least in part, actions that result in selective provision of map segments to each of the one or more communication devices, each of the map segments including the identified actual or virtual routes for the respective communication device, and an identification of the respective location on the respective actual or virtual route using the calculated actual distances traveled.

41. A computer-readable storage medium carrying one or more sequences of one or more instructions which, when executed by one or more processors, cause an apparatus to at least perform the following steps:
causing, at least in part, actions that result in presentation of at least one route via a display of a mobile device;
determining a distance traveled by the device; and
associating the distance traveled with the presented route to indicate an approximate location of the device on the presented route,
wherein the presented route corresponds to a virtual route different from an actual route physically traveled, and
at least one of a starting location and a destination location of the virtual route is different from a starting location and a destination location of the actual route.

42. A computer-readable storage medium carrying one or more sequences of one or more instructions which, when executed by one or more processors, cause an apparatus to at least perform the following steps:
causing, at least in part, actions that result in reception of route selection data and travel distance data from a first device;
determining a distance traveled by the first device based on the received travel distance data; and
causing, at least in part, actions that result in provision of a map segment to the first device, the map segment including at least one route identified using the route selection data; and including an identification on the at least one route a current location of the first device based on the distance traveled.

43. A system comprising:
a mobile device including:
a distance measuring device configured to determine a distance traveled along a route by the mobile device;
a processor configured to determine an approximate location relative to the route based on the distance, and to cause, at least in part, actions that result in presentation on the mobile device of the route and at least the approximate location relative to the route, the presented route corresponding to a virtual route different from an actual route physically traveled, and at least one of a starting location and a destination location of the virtual route being different from a starting location and a destination location of the actual route;
a transmitter configured to transmit the distance and route selection data;
a network entity including:
a receiver configured to receive the route selection data and the distance;
a processor configured to identify at least one route for the mobile device in response to the received route selection data, and to calculate an actual distance traveled by the mobile device in response to the received distance; and
a transmitter configured to transmit at least one map segment to the mobile device, the at least one map segment including the identified route, and an identification of the location on the route using the calculated actual distances traveled.

44. The system of claim 43, wherein the mobile device further includes a display configured to present the route and the identified location on the route.

45. A method comprising:
causing, at least in part, actions that result in presentation of at least one route via a mobile device, the presented route corresponding to a virtual route different from an actual route physically traveled;
determining a distance traveled by the mobile device;
associating the distance traveled with the presented route to indicate an approximate location of the device on the presented route; and
facilitating user modification from a current virtual route to a new virtual route, and applying the distance traveled to the new virtual route.

46. A method comprising:
causing, at least in part, actions that result in presentation of at least one route via a mobile device;
determining a distance traveled by the mobile device;
associating the distance traveled with the presented route to indicate an approximate location of the device on the presented route; and
invoking a communication application to enable user communication appearing to a recipient to originate from a location along the route.

47. A method comprising:
causing, at least in part, actions that result in presentation of at least one route via a mobile device;
determining a distance traveled by the mobile device;
associating the distance traveled with the presented route to indicate an approximate location of the device on the presented route; and
facilitating user modification of the route to be traveled to a destination.

* * * * *